Figure 1:
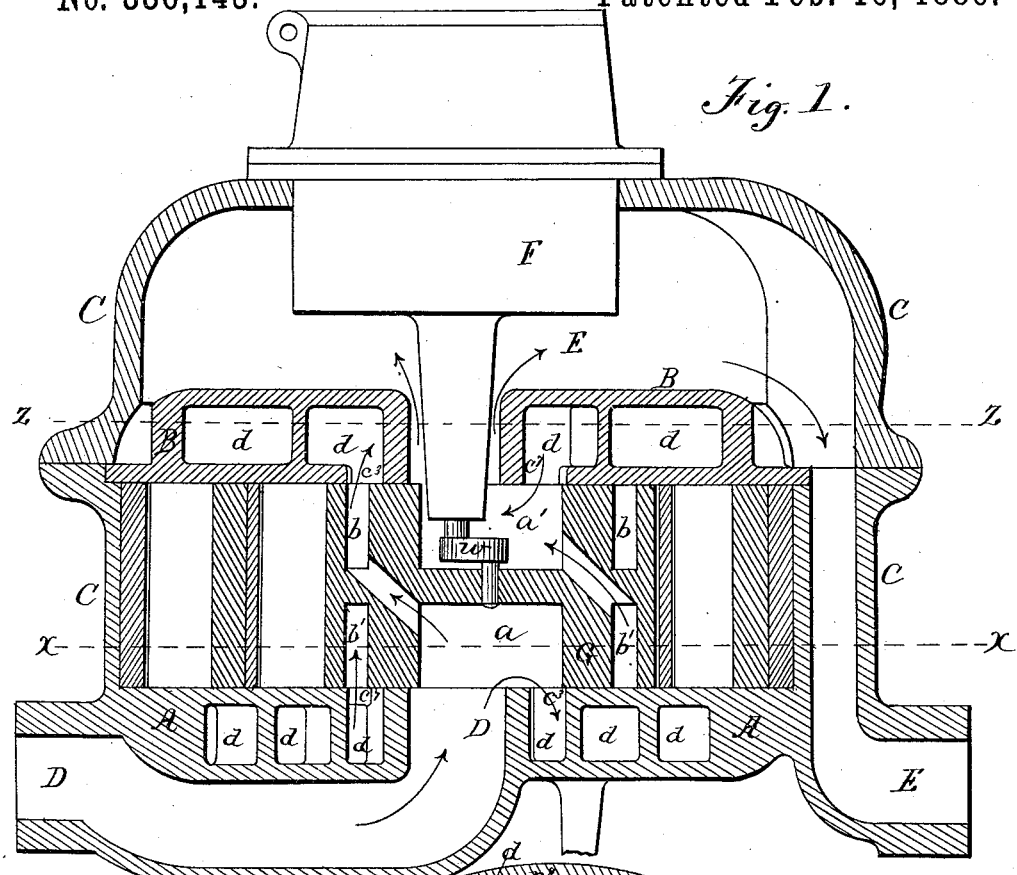

(No Model.) 3 Sheets—Sheet 1.

L. H. NASH.
WATER METER WITH REVOLVING PISTON.

No. 336,143. Patented Feb. 16, 1886.

WITNESSES
INVENTOR
Lewis H. Nash
by Johnson & Johnson
Attorneys.

(No Model.) 3 Sheets—Sheet 2.

L. H. NASH.
WATER METER WITH REVOLVING PISTON.

No. 336,143. Patented Feb. 16, 1886.

WITNESSES
R. E. Grant
W. E. Stearns

INVENTOR
Lewis H. Nash
by Johnson & Johnson
Attorneys (No Model.) 3 Sheets—Sheet 3.

L. H. NASH.
WATER METER WITH REVOLVING PISTON.

No. 336,143. Patented Feb. 16, 1886.

WITNESSES
R. E. Grant
W. E. Stearns

INVENTOR
Lewis H. Nash
by Johnson & Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

WATER-METER WITH REVOLVING PISTON.

SPECIFICATION forming part of Letters Patent No. 336,143, dated February 16, 1886.

Application filed October 19, 1885. Serial No. 180,322. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters, of which the following is a specification.

My improvement herein is directed to the type of water-meter patented to me January 28, 1879, numbered 211,769, in which a valve-forming piston has alternate projections and recesses which continually change their points of bearing with corresponding bearing points and recesses on the inner wall of the inclosing-case, in a manner to cause said piston to have an eccentric movement within the case and every projection of the piston to describe an orbit similar to that described by the center of the piston, which is the path of a circle around the center of the case. Such construction and operation effects the division of the case-chamber at two or more points into receiving and discharging spaces, which continually change their volume, with an unobstructed flow and a positive displacement of the water through the piston-ports from the discharging-spaces of the case-chamber by the revolution of the piston from one bearing-point to another across such chamber.

In my said patent the valve-forming piston has one less number of projections than the case-chamber, while in my present improvement the dividing bearing projections are of equal number in both the piston and the case-chamber, which involves a motion of the piston slightly different from that described in my said patent. Such construction of equal number of coacting joint-forming projections I do not claim, broadly, as both water-meters and steam-engines have been used having such construction, and my improvement in such construction is directed to a more effective and accurate operation of the meter, and to avoid unequal pressure within chambers which are all filling or all emptying by providing free communication between those chambers which are discharging and those which are filling.

To this end my improvement consists of a novel construction of the joint-forming projections of the piston and of the case, whereby, in a water-meter having equal number of such projections on the piston and on the case, the latter will be divided at opposite points, leaving the measuring-chambers on both sides of such division in free communication, and thereby equalize the pressures in all the measuring-chambers. This, so far as I know and can find, has never been proposed in a meter having an equal number of projections on its piston and case, and in the accompanying drawings I have illustrated such improvements, and in which—

Figure 2:
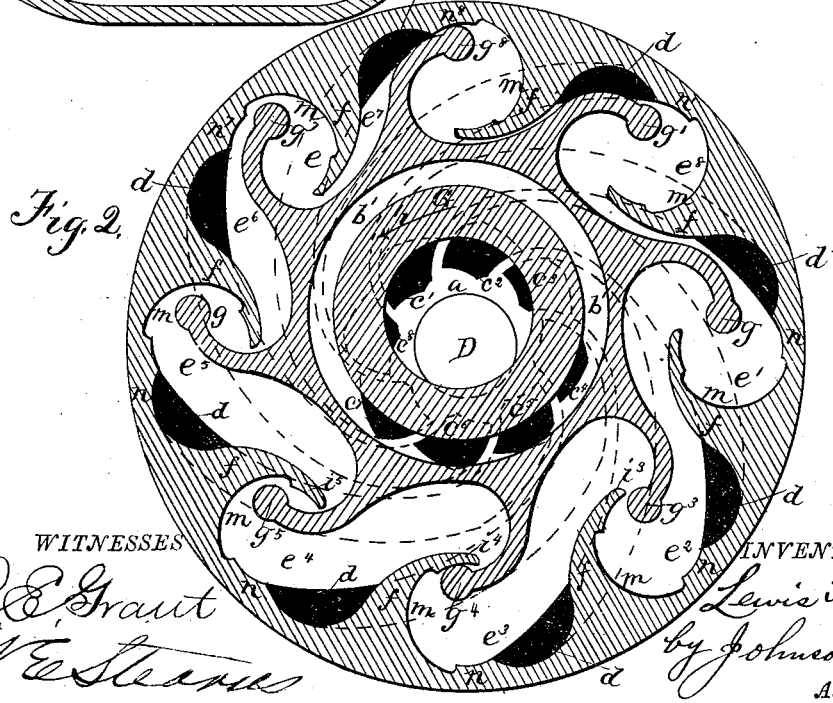
Figure 3:
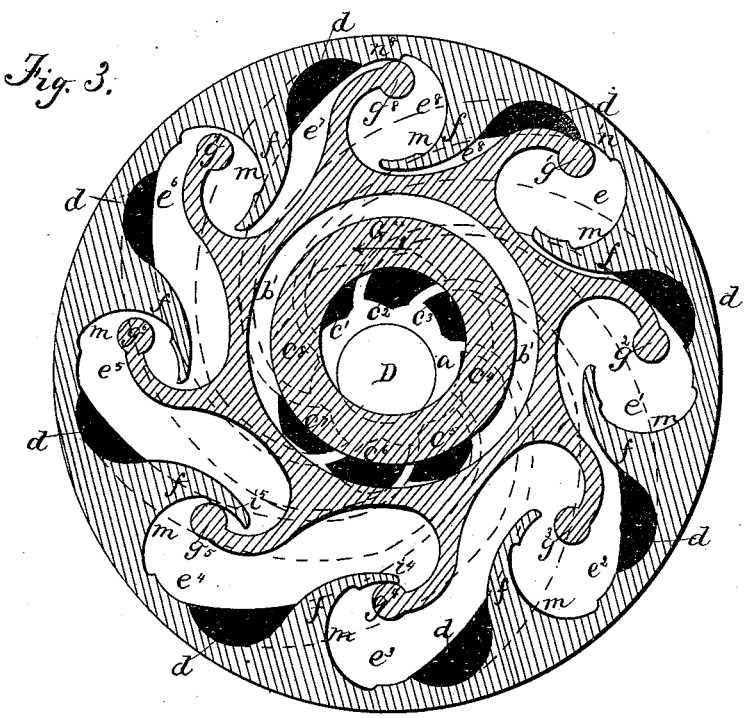
Figure 4:
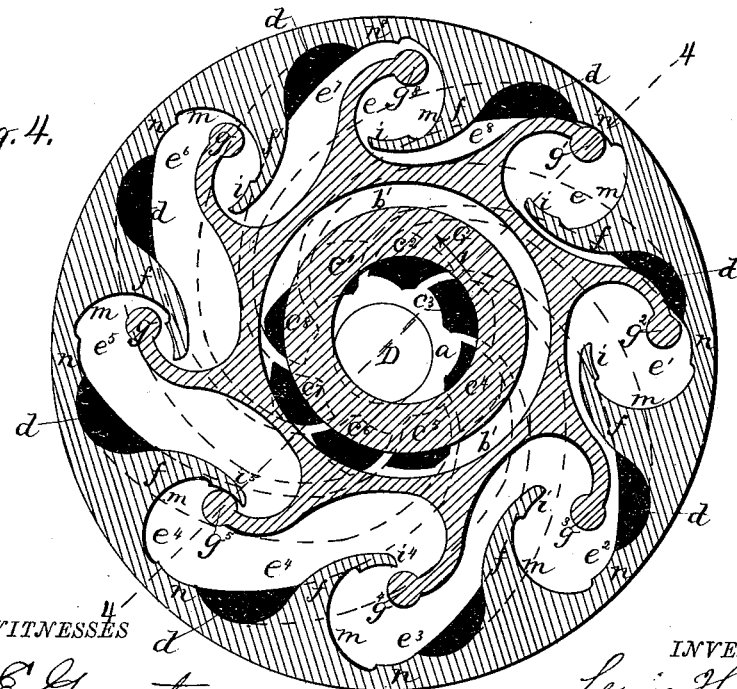
Figure 5:
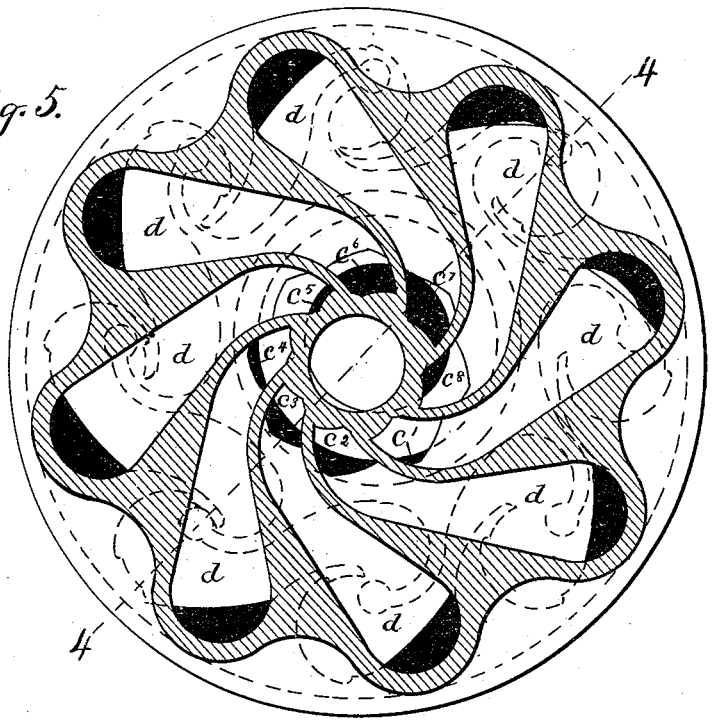
Figure 6:
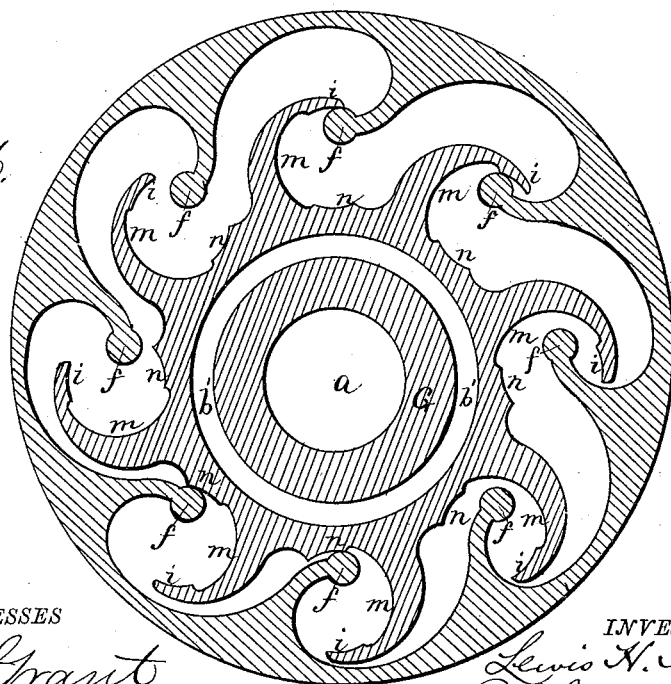

Figure 1 represents a vertical section of my meter, taken on the line 4 4 of Fig. 4; and Figs. 2, 3, and 4 are horizontal sections taken on the line $x\ x$ of Fig. 1, showing different positions of the piston. Fig. 5 represents a horizontal section taken on the line $z\ z$ of Fig. 1; and Fig. 6 represents a modification, showing a slightly-different construction of the joint-forming projections.

The construction and operation of the meter, except in the particulars of the improvements indicated, are substantially the same as in my patent aforesaid.

The piston operates between heads which have an arrangement of inlet and discharge ports, the lower head, A, and the upper head, B, having an arrangement of like ports, which operate in connection with the valved piston. A case, C, incloses these parts and forms the inlet-passage D and the outlet-passage E, within which latter the box F, containing the registering mechanism, depends. The cylinder-heads have central openings, which have perpetual communication with the inlet and outlet passages and the ports $a\ a'$ in the opposite ends of the piston, and which chamber-ports form the inlet and the outlet ports of the piston-valve. The piston G is constructed with interior ports, $b\ b'$, the port $b$ opening at the top end of the piston and into its lower central port, $a$, and the port $b'$ opening at the bottom of the piston and communicating with its top central port, $a'$, and these ports $b\ b'$ are annular. These piston-ports $b\ b'$ are so arranged as to operate with the ports in the heads to admit and discharge the water. The lower head-ports, $c\ c'\ c^2\ c^3$, &c., are placed around the center of the lower head in such relation to the annular piston-ports $a$ and $b'$ as to be alternately opened and closed by the movement of the piston, and these ports $c\ c'$ &c., extend by curved passages $d$ to and open into the chamber measuring-spaces $e'\ e^2\ e^3\ e^4\ e^5\ e^6\ e^7\ e^8$. The arrangement of the ports in the upper head is the reverse of that in the lower head—that is, their communicating passages curve in opposite directions, and they act in the same manner to open and close the chamber measuring-spaces by the movement of the piston. These head-ports are shown in Fig. 1 and in the horizontal sectional views by dotted lines, and in which Fig. 5 also shows their reverse relation in the top head in full lines. The interior wall of the measuring-chamber is formed with alternate projections $f$, which extend from head to head, and are preferably of the curved form shown, and are of a length sufficient to form a joint with similar projections of the piston at certain points only. The piston projections $g$ are preferably curved opposite to that of the case projections, and are formed with bearing ends, which make contact at the points $i$ and $n$ of the case projections, one of which contact-points, $n$, is at the ends of said case projections, and the other, $i$, upon the wall of the case, leaving between these points recess-spaces $m$, which provide for free communication between adjacent chambers, while the piston projection is passing over these recess-spaces $m$, as will be more fully stated in the description of the operation of the meter.

I prefer to make the projections upon the case-wall and upon the piston of the curved form shown, for simplicity of construction, and because the piston only needs to make contact with the case at the two opposite sides of the case.

In Fig. 6 the two bearing-points are upon the piston, but the action is the same as having them upon the case; nor is it necessary that these projections should have the particular form shown, so long as they operate to form the bearing-joints, as stated.

Now, referring to Figs. 4 and 5, the piston is in position to form the division of the case-chamber at the bearing-points $g'$ and $n'$ and $g^5$ and $i^5$, the intermediate spaces between these bearing-points on each side of the piston having free communication. The water enters from the passage D into piston-ports $a$ and $b$, and passes thence through the lower head-ports, $c'$, $c^2$, $c^3$, and $c^4$, thence through their curved passages $d$ into the case-chambers $e'\ e^2\ e^3\ e^4$ on the inlet side of the piston. From the piston-port $b$ the water enters from the upper head into the ports $c'\ c^2\ c^3\ c^4$, passing thence through their curved passages $d$ to the same case-chambers on the inlet side of the piston, driving the piston in the direction of the arrow, and forcing out the water from the case-chambers $e^5\ e^6\ e^7\ e^8$ through the curved passages $d$ and the head-ports $c^5\ c^6\ c^7\ c^8$ into the piston-ports $b'$ and $a'$, and thence through the passage E. In this way the piston is moved to the position Fig. 3. In this figure the contact-points $g'$ and $n'$ and $g^5$ and $i^5$ are on the point of breaking contact, and the points $g^8$ and $n^8$ and $g^7$ and $n^4$ are just making contact; hence the chambers $e^8$ and $e^4$ are closed, and the valve-ports $c^4\ c^8$, connecting with these chambers, are closed. In this position of the piston the water enters through the ports $c'\ c^2\ c^3$, and discharges through the ports $c^5\ c^6\ c^7$, driving the piston in the direction of the arrow 1 to the position Fig. 2. In this figure the contact-points are made at $g^8 n^8$ and $g^4$ and $i^4$, and the head-ports $c^8$ are just open to the inlet and the port $c^4$ just open to the outlet, so that the water now enters the ports $c^3\ c'\ c^2\ c^3$, and escapes through the ports $c^4\ c^5\ c^6\ c^7$, driving the piston in the direction of the arrow 1 until the contact-points $g^7\ n^7$ and $g^3$ and $i^3$ are brought into contact, when the ports $c^3\ c^7$ are closed, and the motion of the piston continued in a similar manner as described in relation to Fig. 4. In this way the piston operates to alternately open and close its ports as its points of bearing upon the case projections change.

Referring to Fig. 4, as illustrating the manner in which free communication is made between adjacent measuring-spaces, it will be seen that there is free communication between the spaces $e'\ e^2\ e^3\ e^4$, since the piston and case do not form contact at any point between these spaces, and therefore if there be any difference in the pressures in these spaces it will be instantly equalized. The same thing is true of the outlet-spaces $e^5\ e^6\ e^7\ e^8$, and therefore there cannot be unequal pressure nor dead-spaces in the case-chambers or any of them during the operation of the meter.

In my said patent the valved piston and the case-chamber are constructed with co-operating joint-forming projections of unequal number, and the piston operates to control both the inlet and the exhaust, while my present improvement effects the same operation with equal number of projections, in which the valved piston has a new motion, which is necessary to control both the inlet and the exhaust.

The communication between the adjacent chambers on each side of the bearing-points is made by forming the points of the projections so that they do not make intermediate contact, because the walls of the piston projections are made so as not to touch the ends of the case projections between these spaces when in communication.

The registering mechanism is controlled by the movement of the piston by means of the crank-connection $w$. (Shown in Fig. 1.)

The form and relation of the bearing projections are determined by the following considerations: Referring to Fig. 3, the measuring-space $e^4$ is shown as just on the point of changing from a receiving to a discharging space, and the points $g^4 i^4$ having just come in contact and the points $g^5\ i^5$ just about to break contact. At this instant the supply-port $c^4$ has been closed by the inlet-port $a$ and is about to be opened by the outlet-port $b'$; hence all communication is closed with chamber $e^t$. Now, if this chamber were rapidly decreasing in size, the water contained therein would be crowded before there was sufficient escape for the water and retard the movement of the piston; but if this chamber changes from a receiving to a discharging chamber at a time when it is not changing in volume, the piston will be free to move, so as to open the discharge-ports without crowding the water in said chamber. It is for this reason that the case and piston projections are so formed as to lap, so that the bearing-points will come in contact when the piston has a motion at right angles to the line joining the points of contact, and hence making no crowding of the water.

I claim—

1. The combination, in a water-meter, of a revolving non-rotating piston having circumferential projecting points and inlet and discharge ports concentric with each other, with a case having an equal number of joint forming points and head-ports operated by the concentric inlet and outlet valve-ports of the piston, substantially as described, for the purpose specified.

2. In a water-meter, the piston and its inclosing-case chamber, both having an equal number of coacting projections adapted to divide said chamber into receiving and discharging measuring-chambers, the combination of such piston having bearing-points with the case projections having wall-recess spaces $m$, whereby to provide for free communication and equal pressure between adjacent measuring-chambers at the inlet and outlet sides of said piston, substantially as described.

3. The combination, in a water-meter, of a revolving non-rotating piston having projecting bearing-points and inlet and outlet ports concentric with each other, with a case having an equal number of joint-forming bearing-points having recesses $m$ in the vertical walls on one side of each projection, and case head-ports $c'$ $c^2$, and operated by said concentric valve-ports, substantially as described, for the purpose specified.

4. In a water-meter, the case and the piston, each having an equal number of joint-forming bearing-points dividing the case-chamber into receiving and discharging measuring-spaces, the wall-recess spaces $m$, connecting the said measuring-spaces, in the manner and for the purpose stated.

5. In a water-meter, the piston having projecting bearing-points and concentric ports, in combination with a case having an equal number of projecting bearing-points, the said bearing-points of the piston and case curved in opposite directions and lapping in the operation of the meter by a movement upon each other without crowding the water in the space which they close, whereby to avoid retarding the movement of the piston, as herein set forth.

In testimony whereof I have hereunto set my hand in the presence of two subscribing witnesses.

LEWIS HALLOCK NASH.

Witnesses:
A. E. H. JOHNSON,
J. W. HAMILTON JOHNSON.